(12) United States Patent
Porath et al.

(10) Patent No.: US 6,339,039 B1
(45) Date of Patent: Jan. 15, 2002

(54) HYDROGEL PRODUCT FOR ADSORPTION PURPOSES

(76) Inventors: Jerker Porath, Storskogsvagen 28, S-756 45 Uppsala; Bo Ersson, Notharsvagen 66, S-757 57 Uppsala, both of (SE)

( * ) Notice: Subject to any disclaimer, the term of this patent is extended or adjusted under 35 U.S.C. 154(b) by 0 days.

(21) Appl. No.: 09/330,077

(22) Filed: Jun. 11, 1999

Related U.S. Application Data

(60) Provisional application No. 60/089,041, filed on Jun. 12, 1998.

(51) Int. Cl.$^7$ ................................. B01J 20/26
(52) U.S. Cl. .................... 502/402; 210/198.2; 502/404; 427/412.2
(58) Field of Search ................ 502/401, 403, 502/404, 402; 210/198.2; 427/213.3, 412.2

(56) References Cited

U.S. PATENT DOCUMENTS

| 4,144,190 A | | 3/1979 | Bowes et al. | |
|---|---|---|---|---|
| 4,238,328 A | | 12/1980 | Bowes et al. | |
| 4,335,017 A | * | 6/1982 | Miles et al. | 252/430 |
| 4,336,161 A | * | 6/1982 | Rosevear et al. | 252/426 |
| 4,883,598 A | * | 11/1989 | Riethorst et al. | 210/656 |
| 5,135,650 A | * | 8/1992 | Hjerten et al. | 210/198.2 |
| 5,320,664 A | * | 6/1994 | Shirato | 75/711 |
| 5,977,014 A | * | 11/1999 | Plischke et al. | 502/401 |
| 6,011,196 A | * | 1/2000 | Wang et al. | 604/368 |

FOREIGN PATENT DOCUMENTS

| WO | WO 90/07376 | 7/1990 |
|---|---|---|
| WO | WO 92/21419 | 12/1992 |
| WO | WO 95/35165 | 12/1995 |

\* cited by examiner

*Primary Examiner*—Stuart L. Hendrickson
(74) *Attorney, Agent, or Firm*—Young & Thompson

(57) ABSTRACT

A hydrogel product for adsorption wherein water non-soluble support matrix is cross-linked with polymers which give rise to a water swellable adsorbent. As support matrix an organic polymer or a combination of such are used; e.g. polysaccharides such as agar, cellulose, or starch, proteins and components of proteins and polysaccharides. The support matrix is substituted with a first soluble polymer material chemically bound to the support matrix, whereupon additional polymer materials are built into the primary synthesized support matrix polymer complex through different kinds of cross-oinks whereby optionally the support matrix is present in the form of an acid- and base-stable residue.

3 Claims, 1 Drawing Sheet

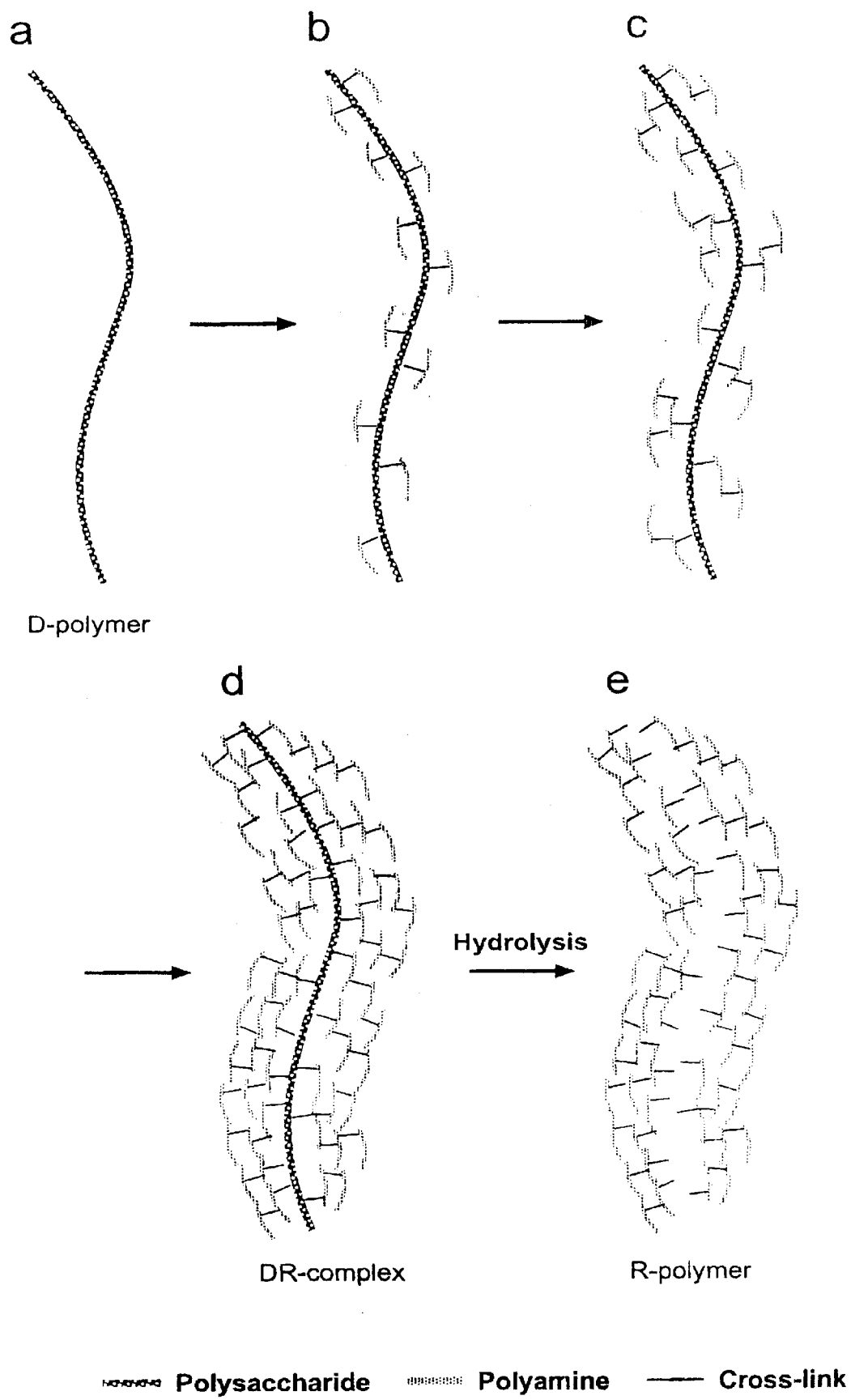

HYDROGEL PRODUCT FOR ADSORPTION PURPOSES

This present application claims priority under 35 USC §119(e) of earlier copending provisional application Ser. No. 60/089,041 filed on Jun. 12, 1998.

The present invention relates to a hydrogel product for adsorption where a non-water-soluble support matrix is cross-linked to polymers which give rise to an in water swellable adsorbent. As support matrix, an organic polymer or a combination of such, e.g. polysaccharide such as agar, cellulose, starch etc., protein and components of protein and polysaccharide.

The present invention aims for achieving an improved adsorbent which selectively binds different materials, preferably metals.

Further, the invention aims for an adsorbent which can be regenerated with required, powerful means without causing the adsorbent to be non-usable, e.g. loses its form, is e.g. eluated or treated with 20% $H_2SO_4$.

Further the invention aims for an adsorbent which effectively may bind and concentrate poisonous compounds and which is cheap enough for making an economically harmless rendering possible of such materials through e.g. dumping.

Further the invention aims for an adsorbent which makes economically recycling of small amounts of valuable metals possible, from large quantities of waste.

These aims and further advantages are obtained with the adsorbent according to the invention which in its most common embodiment is built upon a support matrix consisting of polysaccharide to which different polymers have been cross-linked with other cross-linking agents. The support matrix may also consist of protein or a mixture of protein and polysaccharide.

A polysaccharide such as agarose and cellulose may be interpreted as thread-shaped molecules consisting of monomeric units containing several hydroxyl groups and internal and external ether bonds (acetal bonds), which taken together give the polysaccharide affinity to water (it is said to be hydrophilic). Such polymers form in water swellabe gels with hydroxyls as targets for substitution.

Alkylation of the hydroxyls calls generally for a strong alkaline environment. The present invention relates to a product in which adjacent amino groups have been incorporated into the matrix. These amino groups may be alkylated under less drastic conditions (lower alkalinity than the hydroxyls).

The amino groups are part of polyalkylene imines (which actually ought to be called polyalkylene amines) which first are coupled to the polysaccharide. This can be done at a high pH e.g. 13–14. If an oligoethylene imine or polyethylene imine is selected the amino group density will be higher than the hydroxyl density in the original gel network which is an advantage for the production of the product.

U.S. Pat. No. 4,144,190, 1979 (Bowes et al.) has disclosed a polysaccharide adsorbent produced from a polysaccharide and a nitrogen containing polymer which is possible to acetylate with a cross-linking substance. Steinmann et al. (Talarta, vol 41, No 10, p 1707–1713) synthesized a similar metal adsorbent from agarose and polyethylene imine. The metal ions $Co^{2+}$, $Ni^{2+}$, $Cu^{2+}$, $Zn^{2+}$, $Cd^{2+}$ and $UO_2^{2+}$ were studied. Our adsorbent differs from these metal adsorbents through that the carbohydrate/protein component (the support matrix) may be hydrolysed with a strong acid without causing the product to change shape macroscopically. This component may also be decomposed through oxidation with saturated sodium periodate solution. Where the gel thus retains its form despite these drastic treatments. If the product is produced in the form of particles, these may after acid treatment be packed in beds which allow high filtration velocities. These characteristics are acquired through coupling together soluble polymer with a carbohydrate-polyamine complex in a non-soluble (gel) form with a cross-linking reagent.

G. P. Royer and his group of scientists describe (J.Am.Chem.Soc. 99, 1977, p. 6141–42 (1977J.Org.Chem., 45 (1980) 2269) how an inorganic core in the form of aluminium hydroxide gel is treated with polyethylene imine followed by glutaraldehyde and reaction of the "Schiff" product with sodium boron hydride. The aluminium hydroxide is thereafter dissolved with hydrochloric acid. The differences between this product and the product according to the present invention are, among other things, the following:

1. We use organic polymer preferably polysaccharide and/or protein as support matrix or core material.

2. At least two, often many layers of polyethylene imine are coupled together between themselves and with the support matrix. The difference becomes particularly evident when the polymer former is a low molecular alkylene amine as e.g. tetraethylene pentamine (TEPA). Here the cross-linker may outweigh the polyethylene imine component in the end product.

3. After hydrolytic destruction (degradation) of the polysaccharide and/or the protein, an acid- and base stable residue remains from this (i.e. the support matrix) which may be manipulated chemically (e.g. be substituted). This is not the case with an inorganic core; thus no substitutable remainder is obtained with the invention according to Royer et al. This is an advantage when the polyalkylene amine product becomes hydrophilized with this remainder, most of which ought to have structure —X—O—$CH_2$—CHOH—$CH_2OH$ and —X—O—$CH_2$—$CH_2$—OH where X is a cross-linking structure which has arisen during the coupling. Thus, we have after the acid treatment a stable product with both $NH_2$, NH-groups and OH-groups of which any may be activated and substituted (with the same or different substituents). Even after acid treatment, followed by periodate treatment and final reduction with sodium boron hydride, a polyethylene imine complex remains with attached residues of polysaccharides. These residues should mainly have the structures —$CH_2$—CHOH—$CH_2OH$, and —$CH_2$—$CH_2$—OH with the cross-link to the polyethylene imine still there. These structures are to be regarded as a glycerol ether and a glycol ether, respectively and therefore it makes the product more hydrophilic and biocompatible (and thus more lenient to biological material). The glycerol and the glycol residues may be activated and thereafter substituted. As a higher pH is required for the activation of an aliphatic hydroxyl than an amine, polyamine and alcohol components may independently be activated and substituted. You may therefore substitute the polyamine with a metal chelating agent and the alcohol groups with another group, e.g. an aromatic, substance and thus obtain an adsorbent with double functions. Thus, a such adsorbent may be produced which is resistant to either a strong acid or base.

4. In the invention according to Royer et al, an inorganic core material is included and the polyethylene imine is not coupled to this through chemical combination, but the contact is through physical adsorption and through filling of canals and pores with polyethylene imine (PEI) before cross-linking. The efficiency of the capillary penetration may be questioned. According to the present invention the time for contact between the polyamine and the activated solid phase may be fiery long. All permeably available canals and pores with active groups may then react with penetrating polymer and there be fixed. Thus the contacting between reacting components is totally different.

Thus our adsorbent according to the present invention differs from these above mentioned prior art metal adsorbents through, among other things, that the carbohydrate/protein component (support matrix) may undergo drastic treatments without the product macroscopically changing shape. If then the product is produced in the form of particles, these may after treatment be packed in beds which allow high filtration velocities.

Thus, we have achieved a new adsorbent which overcomes earlier known stability problems in metal adsorbents. Furthermore we may use higher filtration velocities when Losing the present invention, which may be a great advantage in e.g. large scale processes.

SUMMARY OF THE INVENTION

The present invention relates to a hydrogel product for adsorption purposes consisting of an in water non-soluble support matrix and cross-linked polymers, characterized by that the support matrix is substituted with a first, soluble polymer material chemically bound to the support matrix, whereupon additional polymer materials are built in in the primarily synthesized support matrix polymer complex through different kinds of cross-links; optionally the support matrix may be present in the form of an acid- or base-stable residue.

Further the present invention relates to a process for production of this hydrogel product characterized by that polyalkylene imine chains $A_1$ are incorporated into the polysaccharide/protein-network (i.e. the support matrix) which thereafter is activated and at the same time cross-linked with a cross-linking agent $X_1$ whereupon the product is coupled to a new alkyleneimine $A_2$ which thereupon is activated by $X_2$, and so on, or polyalkylene imine chains $A_1$ are incorporated into the network of the support matrix whereupon the product is reacted with a mixture of cross-linking agents and polyamine, and non-reacted reaction products are removed from the solid phase through washing.

DETAILED DESCRIPTION OF THE INVENTION

The wording "support matrix" mean in the present application a matrix which is built up of a first, in water non-soluble polymer material. The invention is demonstrated in the form of a support matrix consisting of cross-linked spherical agarose particles but the support matrix may also comprise agar particles and other polysaccharides, agarose or derivatives thereof, cellulose (e.g. cotton) or derivatives thereof, cross-linked dextran or derivatives thereof, and starch or derivatives thereof, and also proteins, or a combination of polysaccharide and protein.

The support matrix may instead of a polysaccharide comprise a protein with suitable side chains as in the case with hair (wool) and silk. They certain e.g. OH from serene and —S—S— groups which may be converted to —SH and amino groups. OH— groups of the serines may be converted into SH-groups. (Ebert, C., Ebert, G. and Karipp, H. "On the introduction of disulfide cross-links into fibrous proteins and bovine serum albumin", Advances in Experimental Medicine and Biology", vol 86A, 1977, Plenum Press, New York, Editor M. Friedman, p 235–245. Thus it is possible to build up a continuous polyamine around wool or silk thread. With the above mentioned method for incorporating SH— groups, the support matrix may be expanded to other protein and protein complexes. The protein is activated with a bifunctional reagent e.g. a bisepoxide, epichlorhydrin, divinyl sulphone etc whereupon the polyethylene imine is coupled and so on.

A support matrix may be built up from both protein and polysaccharide e.g. through mixing protein particles with agar in a hot solution which thereafter is allowed to congeal in a gel. Polyamine may then be built up around the gel component. In certain cases a such construction of the invention may offer certain advantages. The protein and polysaccharide may separately be enzymatically degraded, alternatively the protein may be degraded in strong alkali whereupon the polysaccharide may be degraded in acid. The intermediate may be substituted. A such selective degradation may be valuable for controlling the porosity of the end product.

The invention according to the present application may also be present in the shape of a pearl, suitably spherical, thread or membrane or may even be porous and spongy (foam plastic shaped). Thus it may be present in a rather arbitrary form.

The wording "an acid- and base-stable residue" mean in the present application a residue which is formed when treating the support matrix with an acid, a base, an oxidizing agent or a reducing agent. The acid may be $H_2SO_4$. The treatment with oxidizing agent may be performed with saturated periodate solution at pH 7. The reducing agent may be sodium boron hydride.

The hydrogel product may also be described with the structural formula:

where

P is the support matrix

Y is a nitrogen-, sulphur- or oxygen bridge $X_1 \ldots X_i \ldots X_n$ are same or different di, tri- or poly-functional cross-linking agents $A_1 \ldots A_i \ldots A_1$ are water-soluble polymer materials, preferably same or different kinds of cross-linked residues of amines, n and i are whole numbers where i<n and n>2.

$A_1 \ldots A_n$ may consist of, one or more, residues of a straight or branched polyalkylene amine (generally called polyalkylene imine), preferably oligo- or polyethylene amine, or residues of any of the amines $NHR_1R_2$ where $R_1$ may be identical to or different from $R_2$ and R may be H, alkyl, aromatic or heterocyclic alkyl, carboxyalkyl or any other amino acid.

The cross-linking agents may be of different kinds. They may be bi-, tri- or polyfunctional. The more activated functions the cross-linking agent possesses the more efficient both the cross-binding and the activation will be. A trifunctional cross-binding agent as e.g. trihalotriazine or e.g. triepoxide may be working both as cross-binding agent and activator. Cross-linking agent ,nay be halohydrin, di-, tri- or polyepoxide, halodiazine or halotriazine, di-, tri- or polyfunctional aldehyde, preferably glutaraldehyde or polymerized glutaraldehyde, di-, tri- or pulyaziridine, $X_1$-alkylene-$X_2$, where $X_1$ and $X_2$ is halogen, preferably ethylene dibromide, or halogen cyanurate.

The cross-linking agents in the products may be of different kinds whereby one or more cross-links may be broken and leave one or more other cross-links intact.

The alkylene imines which are used for production of the product according to the present application may be of a low molecular type e.g. tetraethylene pentamine or high molecular type e.g. polyethylene imine. The amine may have a linear molecular structure or it may be branched as e.g. tris(2-amino ethyl)amine, TREN. The invention relates to polyalkylene amines in general of which polyethylene amine is one example. Reliable experience gives at hand that polypropylene and pulybutylene amine give products with characteristics which do not fundamentally differ from polyethylene variants. The latter are somewhat more hydrophilic.

The invention according to the present application has a considerable stability and it places itself in a preserved, original form even after powerful chemical influence, e.g. elution, treatment using a strong acid, e.g. 20% sulphuric acid, treatment using saturated periodate solution at pH 7, or treatment using sodium boron hydride.

In order to produce the invention according to the present application, different processes may be used:

1. Polyalkylene imine chains A, are incorporated into the polysaccharide/protein-network (the support matrix) which thereafter is activated and, at the same time, cross-linked to a cross-linking agent $X_1$ whereupon the product is coupled to a new alkyleneimine $A_2$ which thereafter is activated $X_2$, and so on, 2. Polyalkylene imine chains $A_1$ are incorporated into the network of the support matrix whereupon the product is reacted with a mixture of cross-linking agents and polyamine and non-reacted reaction products are removed from the solid phase through washing. According to one embodiment of conversion products according to the present invention, the activation and the coupling are repeated several times.

3. A cross-linked polyalkylene network is first cross-linked whereupon it is coupled to the solid polysaccharide/protein-phase (support matrix), which may be cross-linked polysaccharide/protein with or without polyalkylene imine coupled according to (1) or (2).

The processes according to (1), (2) and (3) may also comprise the polysaccharide/protein-network being subjected to degradation whereby an acid- and base-stable residue is formed.

The cross-linking may be performed in another way namely through the cross-binding agent being built up on the amino units. This can be exemplified with allyl chloride or allyl bromide e.g.

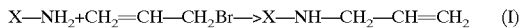

X=the residue of the polymer

The allylamine is thereafter converted in a reactive form through halogenation e.g. bromation with bromine water:

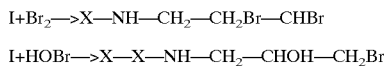

In an alkaline solution epoxide is formed. The bromated product may be coupled to amines such as polyamines but also thiols.

This two-step activation has certain advantages. The amino groups in polyethylene imine are adjacent and ring closing comes under better control and higher capacity may be obtained. Thus you obtain a process where the activation via the polyamine units $A_1$–$A_n$ is takes place through a two-step process where first non-saturated substituents, preferably alkenyl groups, most preferred allyl groups, are incorporated at the primary and/or secondary amino groups whereupon the non-saturated substituents are desaturated with a halogen water, preferably with bromine water, whereupon the coupling to the amines thereafter preferably takes place in an alkaline environment.

The activation and the coupling may be repeated several times or first a polyalkylene network is cross-linked whereupon it is coupled to a solid polysaccharide/protein phase which may be cross-linked polysaccharide/protein with or without polyalkylene imine coupled according to what is mentioned above.

When the thus formed polyethylene imine-polyethylene imine complex in turn is cross-linked with more polyethylene imine an increasingly higher molecular polyethylene imine complex is formed which through repeatedly similar operations gives an increasingly more stable polymer complex. The thus treated particles keeps their form and may thus be subjected to extremely drastic treatment such as with a strong acid or base without losing the metal binding capability under the condition that cross-binding reagents such as epoxides, halohydrins or halogen cyanurates have been used.

It is remarkable that low molecular ethylene amines, such as e.g. tetraethylene pentamine give after repeated reactions according to what is mentioned above, very stable permeable complexes which after reaction with heavy metals such as copper ions even after strong acid treatment retain an essential amount of copper ions, obviously in a strong complex-bound form or confined in the strongly cross-linked molecular network.

In order to produce the product according to the invention there is generally required a sufficient number of, i.e. one or more, reactions involving oligo- or polyethylene imine to take place, whereby a sufficient number of layers with polyamine is obtained, preferably at least 2 layers on the support matrix, most preferred at least 3 layers.

The characteristics of the product according to the invention depends on the density of the matrix (agarose concentration in the particles) and is reflected by how molecules of different size may penetrate into the matrix.

The explanations to why the metal ions are adsorbed by the matrix may also e.g. be thanks to the great amount of amino groups in the matrix which may achieve a Z-potential which is powerful enough for the ions to be captured. The free electron pairs in the amino groups may be those who participate actively when capturing the ions. Thus it may depend upon that there is some kind of reciprocal utilization of electrons (electron delocalization). Covalent binding may be another explanation to why the invention works, as well as electrostatic forces.

Another explanation may be that ringformed (or even spherical) structures are formed which let certain metal ions through but not other. In the long run you may even specially adapt hydrogels according to the invention for special metals through using these metal ions as templates for achieving an adequate design of the gel.

These explanations above shall in any way not be limiting for the scope of the invention but serve for giving feasible explanations to how the invention in the present application works.

In the examples below the invention is demonstrated in the form of different particles e.g. Novarose™ SE 10 (Novarose is a trademark owned by Inovata AB) which preferably is penetrated by protein molecules in average not much greater than 10000 Dalton, Novarose SE 100 which is penetrated by molecules approximately 10 times greater, and Novarose SE 1000 which is penetrated by molecules greater than 1 million Dalton. Some examples have also been performed with a gel which is penetrated of protein molecules with average size up to 300000 Dalton.

Application areas for the present invention may be e.g. within the area of environmental technique an order to remove non-desirable metal ions from leachate. Of course a concentration of metal ions is obtained at the same time which may be desirable to achieve in other applications such as e.g. extraction of metal. Metallurgical industry may have use of this invention partly for removal of metal ions or partly for concentration of metal ions.

The invention will now be illustrated with the following examples and figure. These examples and figure shall not in any way be limiting for the scope of the invention but shall only serve in an explanatory manner.

FIG. 1 shows in step a, the degradable support matrix in the form of a polysaccharide (D-polymer), step b) when polyamines have been cross-linked to the basic matrix and a layer (coating) with polyamines is obtained, i.e. a support matrix polymer complex is obtained, step c, when further polyamines have been cross-linked and an additional layer (whereby a hydrogel product has been obtained) is obtained and step d) when additional polyamines has been cross-linked and an additional layer is obtained, whereby an additional hydrogel product has been obtained (DR-complex) with three layers. Step e) then shows hydrogel product after it has been degraded e.g. through hydrolysis whereby an acid- and base-stable residue of the support matrix is obtained and an additional hydrogel product (R-polymer).

EXAMPLES

Copper in all examples was analysed by AAS, i.e. atom absorption, and nitrogen was analysed by ICP (Inductive Coupled Plasma).

Example 1

50 g of dry-sucked high-activated agarose gel particles with an average diameter of approximately 40 micrometer and an approximately upper limit for penetration of proteins within the interval of 10000–50000 Dalton, Novarose Act$^{High}$ SE10/40 (obtained from Inovata AB), were suspended in water and 2 g of tetraethylene pentamine (TEPA) from Sigma-Aldrich. After 24 hours the particles were filtered on a rough class filter and were washed with water followed by 0.1 M $Na_2CO_3$.

10 g of this intermediate was converted to copper gel which was analysed for copper and nitrogen. Cu: 2.2% ; N: 3.25%

40 g of the intermediate was suspended in 0.1 M $Na_2CO_3$ containing 3% butanediolbisglycidylether. After 1 hour the suspension was filtered and the particles were washed thoroughly and were subsequently suspended in a 20% aqueous solution of TFPA whereupon the particles were collected on a filter and washed. The activation with bisepoxide, washing followed by TEPA-treatment was repeated twice. The product was converted into copper form and was analysed. Cu: 6.0% ; N: 3.89%

According to another embodiment of gel according to the invention, the product was synthesized from a more porous agarose gel than in example 1 (where, according to the manufacturing company, INOVATA AB, the original gel is penetrated by proteins with a molecular weight in the range of 10–50 kDalton). The first coupling was performed using a high molecular polyethylene imine, PET, obtained from Sigma-Aldrich, Milwaukee, USA. Thereafter the gel was saturated with copper sulphate and the excess of copper was washed away. The copper-saturated gel was converted with tetraethylene pentamine, TEPA. The activation was performed in two ways:

a) with butanedioldiglycidylether as is described in Example 2 below and b) with glutaraldehyde as is described in example 3. The product according to Example 2, saturated with copper ions, was activated once more with bisepoxide and was converted with the high-molecular PEI according to Example 4. The purpose here is to show that a gel according to the invention may se obtained irrespective of whether the activation of the intermediate is performed in the presence of or absence of copper ions.

Example 2

68 g of Novarose Act$^{High}$ SE 100/40 was suspended in 70 ml 0,1 M $Na_2CO_3$. 18 g of polyethylene imine (high-molecular) in an aqueous 50 ml solution was added and the reaction was left to continue during 70 hours at room temperature (room temperature in all examples) under shaking. The gel was filtered thereafter on a glass filter and was washed with a great amount of distilled water. The gel was saturated with 0.1 M copper sulphate. The excess of copper ions was washed away with distilled water.

20 g of the copper-saturated gel was suspended in 10 ml of 0.1 M $Na_2CO_3$ and it was activated with 10 ml of butanedioldiglycidylether during two hours. The blue gel was washed with a great volume of distilled water followed by 0.1 M $Na_2CO_3$. The gel was suspended in 10 ml of 0.1 M $Na_2CO_3$ and 10 ml of TEPA. An intense blue solution was obtained. After 48 hours of reaction the gel was washed on a filter with great amounts of distilled water and 0.1 M $Na_2CO_3$. The gel was faintly coloured blue but after saturation with copper sulphate an intensely blue-coloured gel was obtained. Analysis of dried gel resulted in Cu: 6.72%; N: 5.2%

Example 3

The reaction was performed as in Example 2 with the difference that the activation before the TEPA-coupling was performed with 10 ml of glutaraldehyde in 10 ml of 0.1 M $Na_2CO_3$ during 2 hours. The gel was converted as in Example 2 and the copper-saturated product was analysed. Cu: 5.2%; N: 5.4%

Example 4

5 g of he product according to Example 2 in copper form was activated with 5 ml butanedioldiglycidylether suspended in 10 ml of 0.1 M $Na_2CO_3$ during 25 minutes. After the washing the gel was converted with 4 g of 50% PEI (Sigma-Aldrich high molecular, molecule weight unknown) during 24 hours. When the gel was washed with water followed by carbonate solution in the way according to Example 2, an intensive blue gel was obtained. The colour was further enhanced upon addition of copper sulphate.

Experiments were also performed on a gel which is penetrated by molecules and particles above 1000 kDalton.

Example 5

100 g of dry-sucked Novarose Act$^{High}$ 1000/40 was suspended in 100 ml of distilled water and 20 ml of TEPA.

The reaction was left to continue at room temperature during 70 timmar. The gel was washed on a filter and was saturated with copper sulphate.

After further washing with water and 0.1 M $Na_2CO_3$, 10 g of the gel was suspended in 10 ml 0.1 M $Na_2CO_3$ and 10 ml butanedioldiglycidylether. The suspension was shaken at room temperature during 1 hour whereupon it was washed with great amounts of ethanol followed by distilled water. The thus activated gel was immediately coupled with 2.7 g high-molecular PEI (Sigma-Aldrich) in 50% aqueous solution. After 48 hours the product was converted to copper-saturated gel. Analysis gave: Cu: 6.72%; N: 6.24%

The experiments according to the working examples 1–5 show that the product may be obtained in different forms through performing the activation under different conditions with bisepoxide, a bifunctional reagent, and with glutaraldehyde, which in its monomeric form is a bifunctional reagent but contains generally an unspecified amount of polymer wish many functional groups. Further the experiments show that gel product in different form is obtained from polyethylene imines with different molecular weight and with starting-gels with different porosity, and further that gel product also is obtained through activation in the absence of $Cu^{++}$ (Example 1) and in the presence of $Cu^{++}$ (Examples 2–5).

The acid stability of the gel products was tested qualitatively with 2 M $H_2SO_4$. After 3 days of exposure for the acid the gel was captured according to Example 2 on a filter. No change due to the influence of the acid could visually be observed. A bed of gel particles showed excellent flow characteristics and the gel absorbed great amounts of copper ions.

Through cross-linking the agarose-PEI-gel has become very acid stable. Thus, after the agarose has been hydrolysed there remains a very acid-stable gel which consists of strongly cross-linked polyethylene amine gel (in spherical particle form as the original polysaccharide gel) with covalently fixed galactose residues, which is demonstrated by the good ability of the product in adsorbing galactose specific lectines.

Example 6

200 g of spherical cross-linked agarose particles (Novarose SE 1000/40) were suspended in 100 ml of 2 M NaOH. 30 ml epichlorhydrin was added. The reaction was stopped after two hours through washing with ethanol followed by water on a glass filter under vacuum suction. Half of the gel was suspended in 100 ml of 0.2 M $NaHCO_3$+ 0.1 M $Na_2CO_3$. 4 g of high molecular polyethylene imine (Sigma-Aldrich PEI 50% aqueous solution) was added. To the bulk of the suspension 20 ml of tetraethylene pentamine was now added. The reaction was left o continue during 20 hours whereupon the gel was washed on a filter with water. Sample. L2 was obtained and was analysed. Cu 2.1%; N: 2.12%

The main part of the gel (approx. 100 g of dry-sucked product) was suspended in 100 ml of 0.2 M $Na_2CO_3$, 4.5 g of divinyl sulphone was added. After 75 minutes the gel was washed and transferred to 50 ml of 0.2 M $Na_2CO_3$. 9.3 g of polyethylene imine was added and after 90 minutes also 20 ml of tetraethylene pentamine. After 3 days, the reaction was stopped. The gel was washed and converted to copper form and was analysed (L3). Cu: 3.3%; N: 3.8%

Example 7

18 g of the end-product in Example 6 was washed with 0.1 M iminodiacetate whereby the copper was eluted. The gel was transferred to 2 M sulphuric acid. After 48 hours the gel was filtered off and washed with water until a neutral reaction was obtained and converted to copper form and was analysed. Cu: 3.1%; N: 3.77%

Example 6 shows how you through first incorporating polyethylene imine and thereafter adding to the same solution the more low molecular tetraethylene pentamine, efficiently may increase the nitrogen content and the copper capacity. Through thereupon incorporating polyethylene imine and tetraethylene pentamine, now with divinyl sulphone instead of epichlornydrin as coupling-reagent and bridge former at a lower alkalinity, the copper capacity could additionally be increased.

Example 8

In order to also show the base stability of the end product in example 6, 6.5 g of this was treated worth 2M NaOH during 24 hours. As in Example 7 a fast filtering while gel was obtained which was converted to copper form and was analysed. Cu: 3.4%; N: 3.97%

Example 9

114 g of Novarose SE 100/40 High Act was suspended in 100 ml of 0.1 M $NaHCO_3$ and got an addition of 4.6 g dithiotreitol. The flask was left standing on a shaker during 26 hours. The yellow suspension was filtered. Both the solution and the gel were yellow. The gel had good filtration velocity.

44 g M was activated with 5 ml epichlorhydrin 50 ml buffer. After 3 hours the gel was off-filtered, washed with water and thereupon with 0.2 M $NaHCO_3$+0.1 M $Na_2CO_3$ in which buffer the gel was suspended in 30 ml and 6.1 g of PEI 2000 (Sigma-Aldrich) was added. After 3 hours 10 ml of TEPA was added. After an additionally 19 hours the reaction was interrupted and the Gel (M1) was washed and suspended in 50 ml of 0.4 M $Na_2CO_3$. 25 ml of butanediol-diglycidylether was added and the activation was left to go on during 1 hour. After washing and suspending in 50 ml of 0.4 M $Na_2CO_3$, 5.3 g of EPI 2000 was added (Sigma-Aldrich) and the suspension was shaken during 3 days. The washed Gel (42 g) was given an addition of 50 ml of 0.4 M $Na_2CO_3$ and 4.1 g of PEI 2000 (Sigma-Aldrich) and was left standing during 24 hours under shaking. 20 g of the washed Gel (M2) was converted to copper form and was analysed. Cu: 5.2%; N: 3.84%

Example 10

3 samples of the Gel in Example 9 $M_{\alpha 1}$, $B_\beta$ and $M_x$, 4 g of each, were activated with 3 ml of butanedioldiglyciaylether in 20 ml of $Na_2CO_3$ during 15 min, 45 min and 3.5 hours respectively. After the washing the samples were transferred to 10 ml of 0.4 M $Na_2CO_3$ and to each, 5 ml of DPA solution was added. After 24 hours the reaction was stopped and the Gel was tested for Ni-uptake and copper adsorption. The experiment was performed qualitatively analytical and showed an increasing degree of substitution in the order $M_{\alpha 1}$, $<M_\beta$ och $<<M_x$. All gels retained some $Cu^{2+}$ even in 0.2 M sulphuric acid, also in the order $M_{\alpha 1}$, $<M_\beta$ och $<<M_x$.

Conclusion

1. The activation should be performed over a time of more than 1 hour. May be more than 3 hours.
2. The strongest DPA-Gel retains Cu (and maybe Ni) very strong and a considerable amount is not eluated in 0.2 M sulphuric acid.

M, M2 CuM2 and $M_{\alpha 1}$, $M_\beta$ och $M_x$, all filtrate well.

Example 11

100 g of off-drained Novarose GF-300 Act$^{HIGH}$ was washed with 2 l of distilled water on a Buchner funnel. The gel was transferred to a 500 ml Erlenmeyer-flask and approx. 50 ml of distilled water was added. 5 g of TEPA was added and the flask was placed on a shaking table with agitation velocity on 125 rpm. After 15 min another 25 g of TEPA was added to the mixture which was stirred at room temperature over night. The gel was washed with 2 l of water followed by 1 l of 0.1 M $Na_2CO_3$, buffer. The gel was sucked exactly dry and was placed in the 500 ml Erlenmeyer-flask. 50 ml of buffer was added and thereafter 10 g of glycerol propoxylate triglycidyl other. The gel was shaken during 1 hour whereupon it was washed with 1 l of buffer. The gel was sucked exactly dry and was transferred to the 500 ml Erlenmeyer-flask again. 10 g of polyethylene imine$_{600}$ was added and the mixture was shaken during 2 timmar. Thereafter, 40 ml of TEPA was added and the stirring was let to continue over night (20 hours at room temperature). The gel was washed with 2 l of water followed by 1 l of buffer The gel was then transferred to the Erlenmeyer-flask together with 100 ml of buffer and 10 g of glycerol propoxylate triglycidyl ether was added. The mixture was shaken at room temperature during 90 min, at 150 rpm. The gel was then washed with 2 l of water and 30 g of dry-sucked gel was obtained and was marked "Gel A". The residue, approx. 50 g, was washed over to the buffer. The gel was then transferred to the Erlenmeyer-flask again and 50 ml of buffer and 10 g of 50% PEI$_{2000}$ solution was added. Was shaken during 3.5 hours whereupon 20 g of TEPA was added. The mixture was then shaker during approx. 70 hours at room temperature. The gel was washed with 2 l of water and half of it was taken off and was packed and marked "B". The other half was washed over to buffer, dry-sucked, transferred to the Erlenmeyer-flask together with 25 ml of buffer. 5 g of the epoxide was added and the mixture was shaken during 90 minutes. The gel was washed with buffer; was dry-sucked. 25 ml of buffer was added together with 3 g of PEI 2000. The mixture was shaken during 3 hours whereafter 10 g of TREN was added. The mixture was shaken over night (18 hours), washed, and marked "C".

The three gels were measured for copper and were analysed.
A Cu 3.5%; N 3.3%
B Cu 3.8%; N 3.9%
C Cu 4.2%; N 4.0%

Example 12

15 g of Sephadex™ G25 (Sephadex™ is a trademark owned by Amersham-Pharmacia Biotech AB) medium, was swelled in 300 ml of 0.66 M NaOH. 50 ml of butanediol-diglycidylether was added. The mixture was shaken during 2 hours whereupon the Gel was washed on a filter with ethanol followed by water, 61 g of activated Sephadex was obtained which was given 50 ml of water and 22.8 g of polyethylene imine (Sigma-Aldrich). After 70 hours the Gel was furnished. 52 g was given 50 ml of water, 50 ml of NaOH and 50 ml of butanediol bisepoxide. After 3 hours the Gel was washed with ethanol and thereafter water. The Gel was suspended in 50 ml of 0.1 M $Na_2CO_3$ and 34 g of PEI (Sigma) was added. After 20 hours 20 ml of TEPA was added and after additionally 3 hours the experiment was stopped.

The Gel filtered very well and had an intensely blue-greenish colour.

40 g of R2 was hydrolysed with 80 ml of 2 M sulphuric acid. A solid residue of spherical particles was obtained. They adsorbed copper after washing. A fast-filtering gel bed was packed.

Example 13

25 g of the gel product according to Example 12 was suspended in water, 3 g of sodium boron hydride in powder form was added in portions. A heavy generation of gas and heating was noted. The faint yellow gel was decolorized. The suspension was shaken during 40 minutes whereupon it was filtered, washed with water, 0.1 M sodium hydroxide and thereupon water. The dry-sucked gel was transferred to a 300 ml Erlenmeyer-flask. 15 ml of water, 1 ml of 2 M NaOH and 7 ml of butane-dioldiglycidylether was added. After 3.5 hours the gel was filtered and washed and converted to copper form. The gel filtered very well, was coloured very intensely blue. N: 2.9; Cu: 4.1%.

The example shows that a such treated gel, based upon a strongly cross-linked polysaccharide (the double cross-linked dextran Sephadex G25) couples polyethylene imine extremely efficient to a strongly copper-adsorbing product.

Example 14

1 g of cotton was treated with 0.6 M NaOH during 24 hours. The thus treated cotton was transferred to 20 ml 0.6 M NaOH and 6 ml 60% 1,4-butanediol-diglycidyl-ether was added. The contents (in a flask) was shaken during 24 hours, washed, transferred to 30 ml of $Na_2CO_3$. 15 ml of polyethylene imine with MW 2000 was added and the contents was left to react during 24 hours. A minor part was treated with 0.01 M copper sulphate. The cotton product was coloured blue.

The main part of the cotton product, PEI$_1$-cotton, was treated with 0.1 M $Na_2CO_3$ and was activated thereafter with the bisepoxide, washed with 0.1 M $Na_2CO_3$ and treated with polyethylene imine to PEI$_2$-cotton. The activation and the coupling were repeated an additional time to the 3rd generation of copolymer; PEI$_3$-cotton. This was coloured considerably more intense than the PEI$_1$-cotton and could be treated with 30% sulphuric acid during 24 hours with retained thread shape and at a temperature of 60° C.

Example 15

Sponge-formed cellulose was activated and coupled in accordance with example 14. The product adsorbed cooper and retained the shape after acid treatment.

What is claimed is:

1. Process for production of a hydrogel product for adsorption purposes comprising a water insoluble support matrix and cross-linked polymers, wherein the support matrix comprises agar, agarose or derivatives thereof and said cross-linked polymers comprise a first layer of a first soluble polymer material chemically bound to and surrounding the support matrix, and a second layer of an additional polymer material surrounding said first layer and bound thereto, wherein optionally the support matrix is an acid- and base-stable residue; wherein in said process polyalkylene imine chains $A_1$ are incorporated into the support matrix which thereafter is activated and at the same time cross-linked with a cross-linking agent $X_1$ whereupon the product is coupled to a new alkyleneimine $A_2$ which thereupon is activated with $X_2$, or polyalkylene imine chains $A_1$ are incorporated into the support matrix whereupon the product is reacted with a mixture of cross-linking agents polyamine and non-reacted reaction products are removed from a solid phase through washing.

2. Process according to claim 1, wherein the polysaccharide/protein-network is subjected to degradation whereby an acid- and base-stable residue is formed.

3. Process according to claim 1, wherein activation via the polyamine units $A_1$–$A_n$ takes place through a two-step process where first non-saturated substituents are incorporated at the primary and/or secondary amino groups whereupon the non-saturated substituents are desaturated with halogen water, whereupon coupling with the amines thereafter takes place in an alkaline environment.

* * * * *